Sept. 9, 1969      R. PRIESTLEY      3,466,019
GAS-LIQUID CONTACT PACKING SHEETS Filed Aug. 4, 1967      2 Sheets-Sheet 1

United States Patent Office 3,466,019
Patented Sept. 9, 1969

3,466,019
GAS-LIQUID CONTACT PACKING SHEETS
Ronald Priestley, 84 Chesterwood Road, Kings Heath, Birmingham 14, England
Continuation-in-part of application Ser. No. 376,766, June 22, 1964. This application Aug. 4, 1967, Ser. No. 658,388
Int. Cl. B01d 47/12
U.S. Cl. 261—112                16 Claims

ABSTRACT OF THE DISCLOSURE

Packing sheets are described for use in apparatus for effecting contact between a gas or vapour flowing past such sheets and a liquid flowing over the surface of such sheets. By connecting curved portions of the sheet together so that they provide a ridge, greatly increased contact efficiency can be obtained. By suitable sheet contours, sufficiently rigid packing sheets may be made from intrinsically non rigid materials, e.g. sheet plastics materials.

---

This application is a continuation-in-part of my co-pending application Ser. No. 376,766, filed June 22, 1964, now abandoned.

This invention relates to apparatus for use in effecting contact of a gas with a flowing liquid film. There are numerous industrial processes where this type of contact is desired, examples being those where it is desired to effect a heat transfer between the liquid and the gas, as in cooling towers, those in which a gas is required to pick up vapours of a liquid, those in which a liquid is required to dissolve a proportion of a gas, and those in which a liquid and a gas are required to react with one another chemically. Other examples are the fractionation of two or more components by distillation, and biological oxidation processes, such as the manufacture of vinegar.

It is a principal object of this invention to provide new forms of packing for a vessel in which such contact is to be effected, and wherein a liquid is to be caused to flow as a film down the surfaces of packing sheets, assemblies of such sheets forming the packing for the vessel.

According to the present invention, there is provided a packing sheet for apparatus wherein a film of a liquid is caused to flow in contact with a gas, said packing sheet being provided with a plurality of salient curved portions and a plurality of re-entrant curved portions, the axes of curvature of which are all parallel, at least some of said curved portions being connected to one another directly or via a linking portion in such manner that the said directly connected curved portions or the said connected curved portion and linking portion provide a ridge.

The connections between the curved portions are preferably via linking portions. It will be understood that the "curved portions" need not be smooth curves but may be made up of several planar parts which together constitute the substantial curve. Further, while the linking portions are usually, for convenience, planar, and are therefore referred to herein for brevity as the "planar portions," it will be understood that these may, if desired, have some degree of curvature. The term "gas" used herein is to be understood to include vapours.

In use, packing sheets as defined above may be assembled into groups, each sheet being substantially parallel to, and spaced, from the next. The axes of curvature of the curved portions are arranged to be substantially horizontal, and the plane of each sheet is either vertical or at a small angle to the vertical. A film of liquid is caused to flow down the packing sheets, while a gas is passed through the spaces between the sheets.

In order both to impart dimensional stability and uniformity of surface characteristics, it is generally desirable that, travelling vertically up or down the face of a packing sheet, a re-entrant curved portion is followed by a linking portion, in turn followed by a salient curved portion, in turn followed by a further linking portion, in turn followed by a re-entrant curved portion and so on. It is preferably arranged that the packing sheet is stamped, moulded or pressed from a thin sheet of material so that salient and re-entrant curved portions as viewed from one side become re-entrant and salient curved portions respectively when viewed from the other side of the sheet. However, packing sheets may be constructed from, for example, two sheets of material stuck back to back to form a single composite packing sheet. In addition, in order to impart dimensional stability to such a sheet, each sheet may be divided into a number of strips, the direction of the length of a strip being orthogonal to the axes of curvature of the salient and re-entrant curved portions of that strip, and the curvatures in one strip being out of phase with those in the next adjacent strip. The curvatures are preferably 180° out of phase.

According to a further feature of the present invention, therefore, there is provided a packing sheet for apparatus wherein a film of a liquid is caused to flow in contact with a gas, said packing sheet being provided with a plurality of salient curved portions and a plurality of re-entrant curved portions, the axes of curvature of which are all parallel, and which are divided up into a number of strips, the direction of the length of each strip being orthogonal to the axes of curvature, and the curvatures in one strip being out of phase with the curvatures in the next adjacent strip.

It is believed that the advantages of packing sheets according to the present invention stem from the provision of ridges in close juxtaposition to curved portions over which the film of liquid flows. As the gas stream passes over these ridges considerable turbulence is introduced and contact between the liquid film and the gas stream is thereby enhanced.

In use, the assemblies of packing elements are arranged so that a gas can flow between the sheets, and thus in contact with a film of liquid flowing down their surfaces. The gas may travel co-current or counter-current to the flow of liquid.

By means of the invention it has been found possible to increase the performance and efficiency of apparatus of the type referred to by providing, in particular, a single and effective means of achieving good contact between the liquid and the gas while providing a small pressure drop in the gas. It has further been found possible to achieve an improvement in the rigidity of the packing elements so that they can be made of a substance which of itself might have insufficient rigidity for the purpose, by providing that the curvatures of adjacent strips are out of phase with each other, as explained above.

The provision of the ridge, preferably of relatively sharp edge, impedes and diverts the flow of the gas; in this way a smaller pressure drop in the gas is achieved as compared for example with that obtained using a sinusoidal packing, for a given rate of heat transfer.

In order to ensure an even distribution of the liquid film running down a packing sheet according to the present invention, the surface of the sheet is preferably dimpled. The dimension of such dimpling is, of course, small with respect to the size of the curved and planar portions of the sheet. The dimpling preferably takes the form of a large number of adjacent small depressions on the sheet surface.

The dimpling on the curved and linking portions serves to spread the liquid film, while that on the ridges serves to minimise the tendency for liquid to flow along the ridge, especially when the ridges are not held accurately horizontal.

Specific forms of packing sheet and apparatus containing such sheets according to the invention are illustrated in the accompanying drawings in which.

FIGURES 5, 6, 7, and 8 show cross sections through alternative packing sheets according to the invention.

Figure 1:
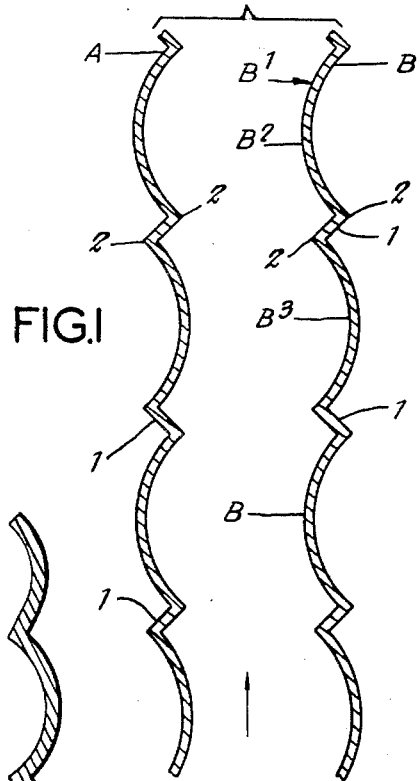
FIGURE 1 is a diagram showing in cross section two adjacent packing sheets in accordance with the invention.

In FIGURE 1 there are shown in cross section parts of two identical packing sheets A and B arranged in spaced relationship to leave a passage between them for upward flow of gas. Liquid flowing down either surface of each sheet passes successively over salient and re-entrant portions of the surface of the sheet. Each sheet has linking portions 1 which connect adjacent curved portions, the junctions between linking portions 1 and the curved portions constituting ridges 2, so that in respect of a particular surface down which liquid flows, the liquid will pass down a portion 1 in flowing from a salient portion of said surface to a re-entrant portion, and in flowing down from a re-entrant portion to a salient portion in each case passing over a ridge 2. If $B^1$ is the flow surface of sheet B, then, as seen from sheet A, the salient portions of said surface are $B^2$, the re-entrant portions being $B^3$. The surfaces of A and B define, by their contours, the shape of the passage between them for the flow of vapour or gas. In the construction shown the formation of each sheet is such that each inclined portion 1 is midway between the crest of the salient surface portion $B^2$ and the centre of the re-entrant portion $B^3$, but the portion 1 could be at some other intermediate position by having the area of $B^2$ and $B^3$ of relatively different length. The effect of the inclined portions 1 in the passage between the sheets A and B is to achieve by baffle action and flow diversion a small pressure drop in the vapour or gas flowing up said passage.

In applying the construction shown in FIGURE 1 to packing sheets in the form of rigid or substantially rigid plates or sheets, for instance made of sheet metal, asbestos cement, graphite or sheet plastics material, the same cross section can be preserved across the full width of the sheet, so that each inclined portion 1 also extends uniformly across said sheet. It is, however, preferable to divide the sheet into a number of strips, to increase its rigidity.

Figure 2:
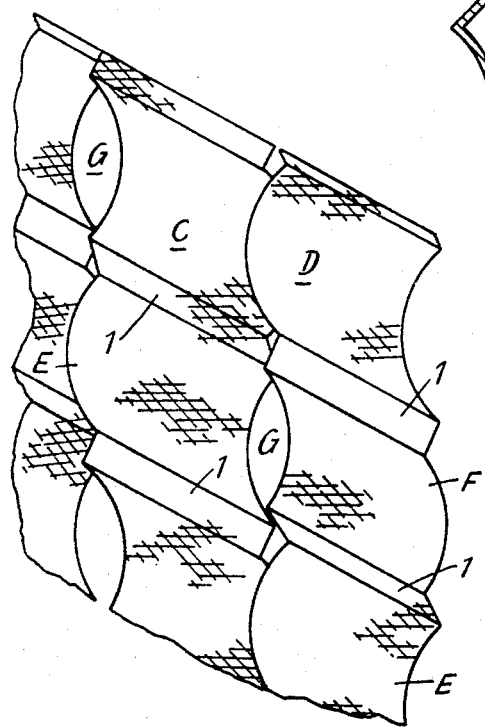
FIGURE 2 is a perspective view of one side of a packing sheet according to the present invention.

FIGURE 2 shows a mode of sheet construction which may make use of material of intrinsically non-rigid nature, but which nevertheless will afford the desired rigidity of the final sheet. In this construction the sheet material is formed by providing side-by-side strips C and D which have their curvature out of phase so that a salient portion E of one strip is adjacent a re-entrant portion F of the next strip, the portions which constitute these strips C and D being integral with each other and united by portions G. These portions G are arranged at right angles to the general plane of the sheet and serve as stiffening webs. Instead of being at right angles to the plane of the sheet, these portions may be slightly angled. This is generally so when the sheets are made by a moulding technique and the slight inclination of the webs serves to assist in separating the moulded sheets from the moulds. Each strip C and D includes the inclined portions 1 arranged as set forth above.

In respect of each of the embodiments shown, more particularly FIGURE 2, each sheet may have a dimpled surface, formed to present a multiplicity of cells to aid liquid distribution; these cells may be in the form of depressions in the sheet surface. The dimpling of the surfaces of the sheets ensures the advantage of efficient distribution of a liquid film when sheet materials made of substances having poor wetting properties are employed, for instance certain synthetic plastics materials, and in the case of mass transfer operations, the advantage of an increased mass transfer ratio due to turbulence created in the liquid film.

Reverting to FIGURE 1, the inclined portions 1 preferably do not extend beyond an imaginary plane tangent to the crests of curved portions $B^2$. In FIGURE 1 the sheets are shown arranged in mutually corresponding positions to preserve a substantially uniform cross-sectional area of the passage for vapour or gas flow; however, the sheets may be relatively off-set vertically to any extent up to that in which a salient face portion of one element is directly opposite a salient face portion of the other element, the effect being to obtain different extents of low pressure drop of the fluid ascending the passage.

Figure 3:
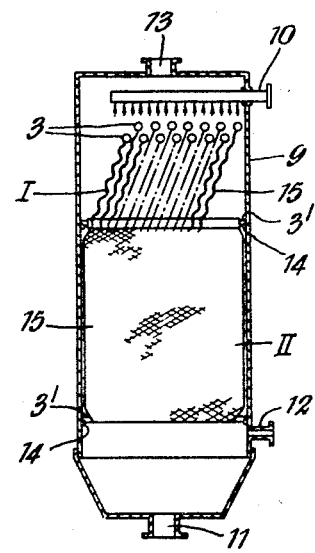
FIGURE 3 is a diagrammatic vertical section through a form of apparatus embodying the invention.
Figure 8:
Figure 4:
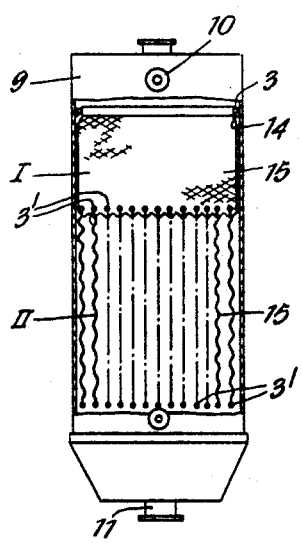
FIGURE 4 is also a diagrammatic vertical section through the apparatus shown in FIGURE 3 but at right angles thereto.
Figures 5, 6, 7:
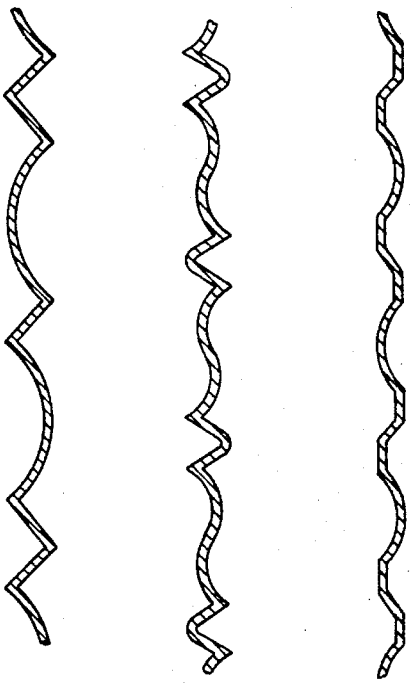

In the apparatus shown in FIGURE 3 and 4 the plates have been shown, for simplicity, as simple corrugated plates but have in fact the contours of sheets according to the present invention such as those shown in FIGURES 1, 2, 5, 6, 7, and 8.

The apparatus shown in FIGURES 3 and 4 comprises a casing 9 having a liquid-admission pipe 10, a liquid outlet 11, a gas inlet 12 and a gas outlet 13. The pipe 10 has spraying orifices which cause jets of liquid to impinge on to an upper assembly of packing sheets 15 denoted by reference I, these sheets being of plate form and constructed and arranged as above described. To intercept the streams of liquid to good advantage rods 3, which carry the plates 15, may be of a dameter larger than would allow same to be accommodated side-by-side at the same level, in which case (as shown) said rods may be disposed alternately at a higher and lower level. The plates 15 of the said batch I are in parallel sloping dispositions (for instance inclined at about 30 degrees to the vertical), being thus maintained by their bottom edges resting on plates of a lower assembly of plates II. The lower portions of the plates of batch I are notched to receive the upper portions of the plates of batch II and upper supporting wires 3' thereof. In general said bottom edges of the plates of batch I are of zig-zag or saw-tooth form and meet the upper edges of the plates of batch II, so that the liquid is caused to run from the plates of batch I to the plates of batch II.

The plates of batch II are of the same form as those of batch I and are vertically disposed in parallel spaced relationship, both surfaces of each plate serving as liquid-conveying surfaces.

The rods 3 carrying the plates of the upper batch I and wires 3' carrying the plates of the lower batch II are mounted on supports 14 or held in place in any other suitable manner.

In illustration of the advantages obtained by the use of the packings characteristic of this invention, tests have been carried out on the humidification of air with water flowing down the plates. With a plate spacing of 1¾ ins. the performance as measured by the height of a batch of plates was the same for both the packing of FIGURE 1 and a packing composed of sheets of sinusoidal cross-section. The pressure drop of the air with the packing of FIGURE 1 was 1 velocity-head per foot height of packing compared with 2.8 velocity heads per foot height of packing for the packing with sheets of sinusoidal cross-section. In many liquid/vapour contacting operations, e.g. water cooling towers, the pressure drop through the packing is of vital importance in its effect on the power consumption of the fans drawing the air through the packing or the height of stack required (for natural draught towers).

With the strips of the packing of FIGURE 2 arranged vertically the elongation caused by a vertical load on a sheet formed from 0.010 in. thick polyvinyl chloride foil was found to be less than that caused by the same load on a sinusoidal corrugated sheet formed from 0.040 in. thick polyvinyl chloride sheet.

The present invention includes not only packing sheets, as hereinbefore defined, but assemblies of packing sheets for use in apparatus wherein a film of a liquid is caused to flow in contact with a gas, and apparatus wherein a film of liquid is caused to flow in contact with a gas which contains packing sheets or assemblies of such sheets as described above.

I claim as my invention:

1. A packing sheet for use in an apparatus wherein a film of a liquid is caused to flow in contact with a gas, at least a pair of said members when used in a gas and liquid contact apparatus being spatially disposed with respect to each other to define a tortuous passage through which the gas can flow and down the surfaces of which the liquid can flow, said packing sheet being provided with a plurality of salient curved portions and a plurality of re-entrant curved portions, the axes of curvature of which are all parallel, at least one linking portion interposed between at least some of said curved portions, said linking portion comprising a planar portion angled in relation to said curved portions to form discontinuities with said curved portions.

2. A packing sheet according to claim 1 wherein at least some of the curved portions are connected to one another directly and the said directly connected curved portions form a ridge.

3. A packing sheet according to claim 1 wherein said linking portion connects substantially all of said curved portions.

4. A packing sheet according to claim 1 wherein a re-entrant curved portion is followed by a salient curved portion, in turn followed by a re-entrant curved portion, and so on.

5. A packing sheet according to claim 1 wherein the sheet is formed from a thin sheet of material so that salient and re-entrant curved portions as viewed from one side become re-entrant and salient curved portions respectively when viewed from the other side of the sheet.

6. A packing sheet according to claim 1 constructed from two sheets of material stuck back to back to form a single composite packing sheet.

7. The packing sheet of claim 1 wherein said linking portions and curved portions provide sharp edges at their line of intersection.

8. A packing sheet according to claim 1 wherein the surface of the sheet is dimpled.

9. A packing sheet according to claim 8 wherein the dimpling takes the form of a large number of adjacent small depressions in the surface of the sheet.

10. A packing sheet for use in an apparatus wherein a film of a liquid is caused to flow in contact with a gas, at least a pair of said members when used in a gas and liquid contact apparatus being spatially disposed with respect to each other to define a tortuous passage through which the gas can flow and down the surfaces of which the liquid can flow, said packing sheet being provided with a plurality of salient curved portions and a plurality of re-entrant curved portions, the axes of curvature of which are all parallel, and being divided up into a number of strips, the direction of each strip being orthogonal to the axes of curvature, and the curved portions in one strip being out of phase with the curved portions in the next adjacent strip.

11. A packing sheet according to claim 10 wherein the curved portions of one strip are substantially 180° out of phase with the curved portions of the next adjacent strip.

12. The packing sheet of claim 10 including planar portions connecting adjacent curved portions and being angled in relation to said curved portions to form discontinuities with the curved portions.

13. A packing sheet according to claim 10 wherein the surface of the sheet is dimpled.

14. A packing sheet according to claim 13 wherein the dimpling takes the form of a large number of adjacent small depressions in the surface of the sheet.

15. A gas and liquid contact apparatus comprising a plurality of packing sheets, said members being spatially disposed with respect to each other to define a tortuous passage through which the gas can flow and down the surfaces of which the liquid can flow, each of said packing sheets comprising a plurality of salient curved portions and a plurality of re-entrant curved portions, the axes of curvature of which are all parallel and at least one linking portion interposed between at least some of said curved portions, said linking portion comprising a planar portion angled in relation to said curved portions to form discontinuities with said curved portions.

16. A gas and liquid contact apparatus comprising a plurality of packing sheets, said sheets being spatially disposed with respect to each other to define a tortuous passage through which the gas can flow and down the surfaces of which the liquid can flow, the said members each being constructed of side-by-side strips having a plurality of salient curved portions and a plurality of re-entrant curved portions, the axes of curvature of which are all parallel, the direction of each strip being orthogonal with respect to the axes of curvature and the curved portions in one strip being out of phase with the curved portions of an adjacent strip.

References Cited

UNITED STATES PATENTS

| 2,043,988 | 6/1936 | Brown | 161—136 XR |
| 2,077,427 | 4/1937 | Lissman | 261—112 |
| 2,180,586 | 11/1939 | Gustafsson | 55—241 X |
| 2,198,305 | 4/1940 | Crawford | 261—103 X |
| 2,231,088 | 2/1941 | Richardson | 261—112 |
| 2,917,292 | 12/1959 | Hittrich | 261—112 X |
| 3,150,211 | 9/1964 | Murray et al. | 261—112 |
| 3,260,511 | 7/1966 | Greer. | |
| 3,281,307 | 10/1966 | Mueller et al. | 261—112 X |

FOREIGN PATENTS

| 846,092 | 8/1952 | Germany. |
| 13,222 | 1904 | Great Britain. |

TIM R. MILES, Primary Examiner